US008661448B2

(12) United States Patent
Ashish et al.

(10) Patent No.: US 8,661,448 B2
(45) Date of Patent: Feb. 25, 2014

(54) LOGICAL PARTITION LOAD MANAGER AND BALANCER

(75) Inventors: Shivendra Ashish, Hyderabad (IN); Srikanth R. Joshi, Bangalore (IN); Yogesh G. Patgar, Bangalore (IN); Raghavendra K. Prasannakumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/218,918

(22) Filed: Aug. 26, 2011

(65) Prior Publication Data

US 2013/0055277 A1 Feb. 28, 2013

(51) Int. Cl.
*G06F 9/46* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS 7,140,020 B2 * 11/2006 McCarthy et al. ............ 718/104
7,721,292 B2 * 5/2010 Frasier et al. ................. 718/104
8,219,769 B1 * 7/2012 Wilk ............................. 711/162
8,347,307 B2 * 1/2013 Dawson et al. ............... 718/105
2004/0143664 A1 7/2004 Usa et al.
2005/0182788 A1 8/2005 Arndt et al.
2006/0184938 A1 * 8/2006 Mangold ........................... 718/1
2009/0178049 A1 7/2009 Branda et al.
2009/0183166 A1 7/2009 Dillenberger et al.
2010/0229171 A1 9/2010 Yoshimura et al.
2010/0241785 A1 * 9/2010 Chen et al. ......................... 711/6
2011/0119670 A1 * 5/2011 Sugumar et al. .................. 718/1
2012/0054367 A1 * 3/2012 Ramakrishnan et al. ..... 709/242
2013/0013678 A1 * 1/2013 Murthy ......................... 709/204

FOREIGN PATENT DOCUMENTS

JP 2006318447 A 11/2006

OTHER PUBLICATIONS

Wenyu Zhou, Shoubao Yang, Jun Fang, Xianlong Niu and Hu Song, VMCTune: A Load Balancing Scheme for Virtual Machine Cluster Based on Dynamic Resource Allocation,2010, IEEE, 2010 Ninth International Conference on Grid and Cloud Computing, p. 81-86.*

* cited by examiner

*Primary Examiner* — Emerson Puente
*Assistant Examiner* — Charlie Sun
(74) *Attorney, Agent, or Firm* — Stephen R. Tkacs; Stephen J. Walder, Jr.; Libby Z. Toub

(57) ABSTRACT

A mechanism is provided in a data processing system for managing and balancing load in multiple managed systems in a logical partitioning data processing system. Responsive to a critical logical partition requiring additional resources, the mechanism determines whether one or more managed systems have available resources to satisfy resource requirements of the critical partition. The mechanism performs at least one partition migration operation to move at least one logical partition between managed systems responsive to determining that one or more managed systems have available resources to satisfy resource requirements of the critical partition. The mechanism performs at least one dynamic logical partitioning operation to allocate resources to at least one of the one or more critical logical partitions responsive to performing the at least one partition migration operation.

20 Claims, 8 Drawing Sheets

BEGIN
502 MONITOR CR SET OF LPAR
504 CR USAGE ≥ MAX? NO / YES
506 ADD CR LPARS OVER MAX TO CR'
508 DETERMINE SUM OF EXTRA RESOURCES NEEDED BY CR'
510 DLPAR SATISFY REQUIREMENTS? YES / NO
512 START DLPAR PROCESS
514 FIND SET OF LPM-ABLE LPAR AND TARGET MANAGED SYSTEMS
516 LPM SATISFY REQUIREMENTS? YES / NO
518 START LPM PROCESS FOLLOWED BY DLPAR
520 DETERMINE TOTAL AMOUNT OF RESOURCES AVAILABLE WITH POSSIBLE LPM ACTIVITY
A
522 PULL RESOURCES FROM OTHER SET OF LPAR RUNNING WITH NON-CRITICAL APPLICATION
524 FIND SET OF LPM-ABLE LPAR AND TARGET MANAGED SYSTEMS
526 SUM SATISFY REQUIREMENTS? NO / YES
528 PERFORM POSSIBLE SET OF LPM, DLPAR TO SATISFY RESOURCES NEED BASED ON PRIORITY
530 PULL RESOURCES FROM OL, PERFORM DLPAR AND LPM ACTIVITY, AND ALLOCATE RESOURCES TO CR'
END

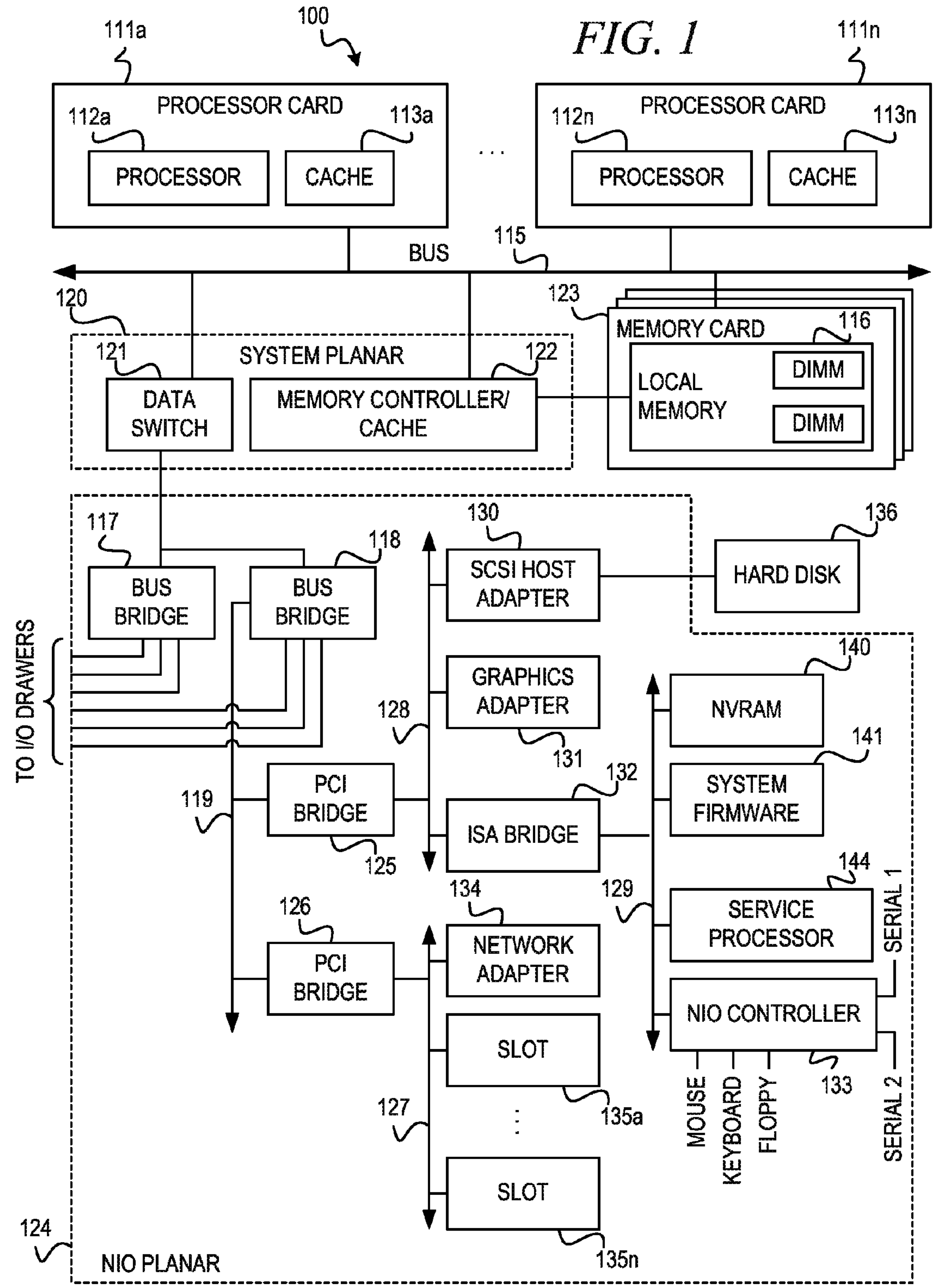
FIG. 1
100
111a
111n
PROCESSOR CARD
112a
113a
PROCESSOR
CACHE
PROCESSOR CARD
112n
113n
PROCESSOR
CACHE
BUS
115
120
123
MEMORY CARD
116
SYSTEM PLANAR
121
122
DATA SWITCH
MEMORY CONTROLLER/ CACHE
LOCAL MEMORY
DIMM
DIMM
117
118
BUS BRIDGE
BUS BRIDGE
130
SCSI HOST ADAPTER
136
HARD DISK
TO I/O DRAWERS
GRAPHICS ADAPTER
128
131
140
NVRAM
141
SYSTEM FIRMWARE
119
PCI BRIDGE
132
ISA BRIDGE
125
126
134
129
144
SERVICE PROCESSOR
SERIAL 1
PCI BRIDGE
NETWORK ADAPTER
NIO CONTROLLER
SLOT
135a
127
SLOT
MOUSE
KEYBOARD
FLOPPY
133
SERIAL 2
124
NIO PLANAR
135n

```
min_max_calculation():
while (OL[] != NULL)
{
continuously monitor OL[] for peak usage and workload distribution over time and
change MIN and MAX value for LPAR accordingly
}
```

*FIG. 4A*

```
monitor_CR():
if (lpar(s) from CR >= MAX)
{
    CR`={set of lpar's currently requiring attention, i.e exceeded MAX}
    while (CR`[] != NULL)
    {
        A=(profile value of resource)*X/100
        TOTAL_REQ=TOTAL_REQ+A
    }
    if ( check if DLPAR won't satify the required resource)
    {
         if (!(find_target_MS(TOTAL_REQ, LL)))
         {
                if (doing LPM satisfies CR` requirement)
              {
                  Perform DLPAR followed by LPM to satisfy CR` requirements
                   return 0
               }
          else
                TOTAL={amount of resource can be available after LPM}
          }
          while (OL[] != NULL)
         {
               if ( usage of OL < MIN )
              {
                     B=pull_resource()
                     TOTAL=TOTAL+B
                     if (TOTAL >= X` )
                    {
                          pull the resource from the OLs in to available pool
                          find_target_MS(TOTAL_REQ, LL)
                          Do LPM and DLPAR activity to satisfy the CR' resource need
                          return 0
                    }
              }
         }
     }
     else
        do DLPAR to satisfy CR' request ; return 0;
        return 1
}
```

*FIG. 4C*

```
pull_resource():
current_usage={current usage percentage depending on peak usage of LPAR and
workload distribution over time}
if ( current_usage < MIN )
  return (pull the amount of resource from LPAR using DLPAR, so that peak usage
shouldn't exceed MIN)
return -1
```

*FIG. 4D*

```
find_target_MS(TOTAL_REQ, LL):
MS_pool={set of managed systems with the resource used , unused}  /* array of
struct with used,unused resources.
Arrange the lapar in LL[] list , so that LPAR hosted on same MS as CR' list LPAR get
higher priority.

while (LL[] != NULL)
{
    while (MS_pool[] != NULL)
    {
        A={resources available in MS_pool[]}
        if (A >= (profile or modified profile value for LL[] in case LL[] belongs to
CR`))
        {
          total used resource of MS_pool[i]=+A;
          total unused MS_pool[i] = -A
          TOTAL=TOTAL+A
          if (TOTAL >= TOTAL_REQ)
            return 0
          else
             break
        }
    }
}
return 1
```

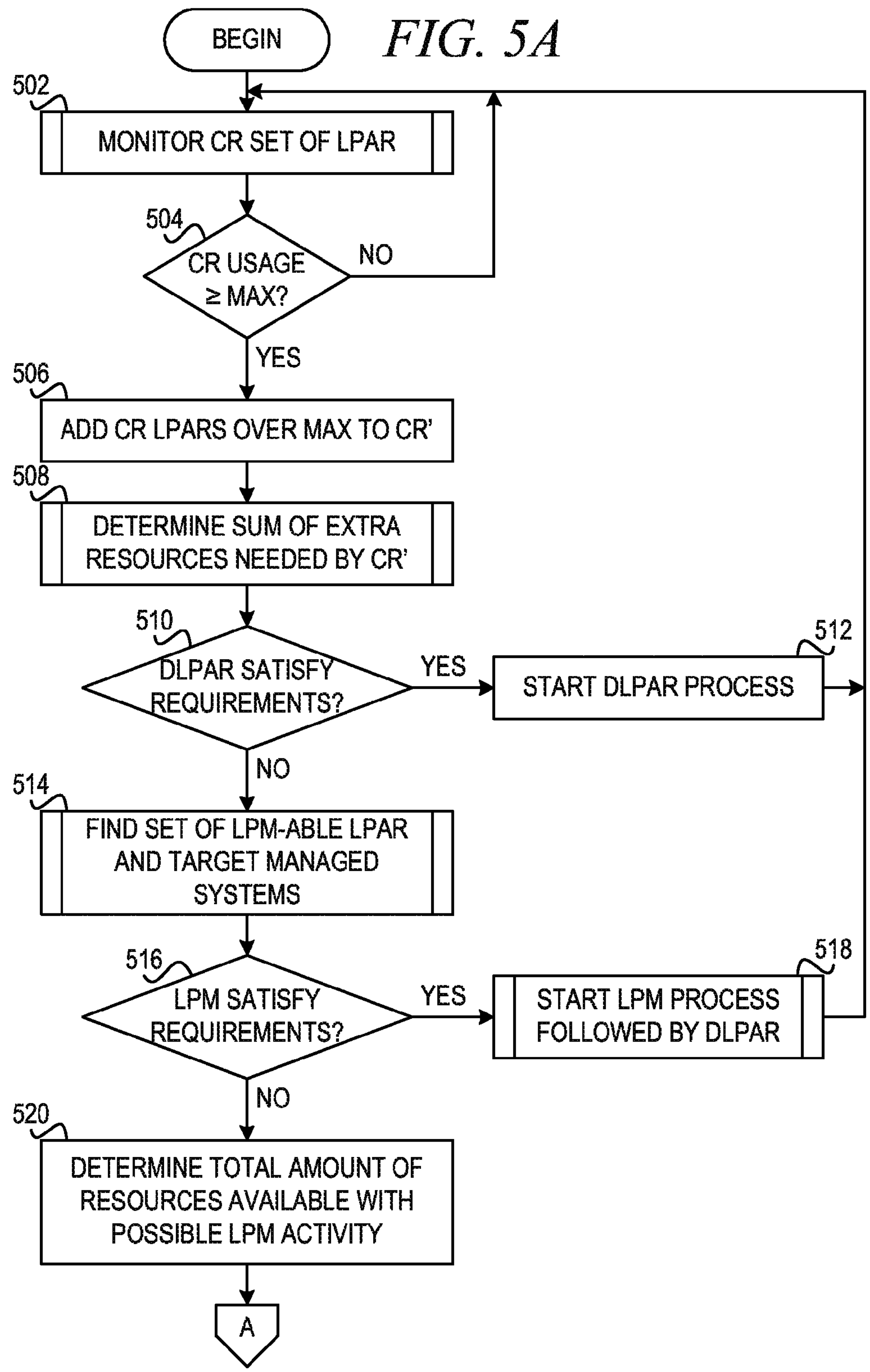
FIG. 5A
BEGIN
502
MONITOR CR SET OF LPAR
504
CR USAGE ≥ MAX?
NO
YES
506
ADD CR LPARS OVER MAX TO CR'
508
DETERMINE SUM OF EXTRA RESOURCES NEEDED BY CR'
510
DLPAR SATISFY REQUIREMENTS?
YES
512
START DLPAR PROCESS
NO
514
FIND SET OF LPM-ABLE LPAR AND TARGET MANAGED SYSTEMS
516
LPM SATISFY REQUIREMENTS?
YES
518
START LPM PROCESS FOLLOWED BY DLPAR
NO
520
DETERMINE TOTAL AMOUNT OF RESOURCES AVAILABLE WITH POSSIBLE LPM ACTIVITY
A

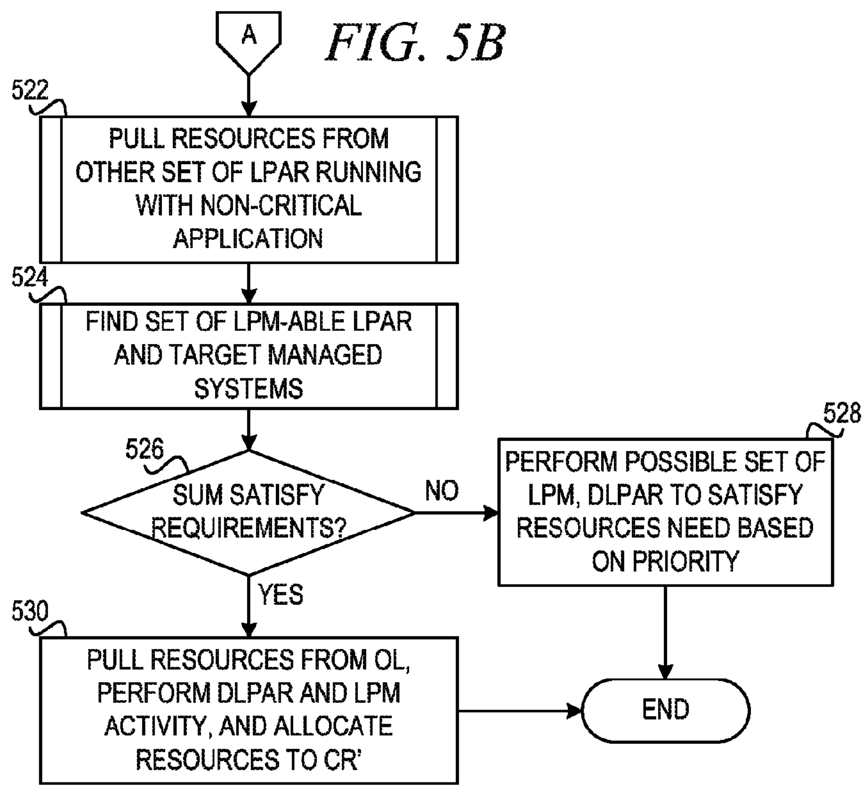

*FIG. 6*

BEGIN

602 ARRANGE LPM-ABLE LPAR WITH PRIORITY, LPAR HOSTED ON SAME MS AS CR' LIST GET HIGH PRIORITY

604 DETERMINE SUM OF AMOUNT OF RESOURCES AVAILABLE ACROSS MANAGED SYSTEMS AFTER POSSIBLE LPM ACTIVITY

END

*FIG. 7*

BEGIN

702 DETERMINE CURRENT USAGE PERCENTAGE DEPENDING ON PEAK USAGE OF LPAR AND WORKLOAD DISTRIBUTION OVER TIME

704 CURRENT USAGE < MIN?

NO

YES

706 PULL RESOURCES FROM LPAR TO AVAILABLE POOL WITH DLPAR SO PEAK USAGE SHOULD NOT EXCEED MIN USAGE

END

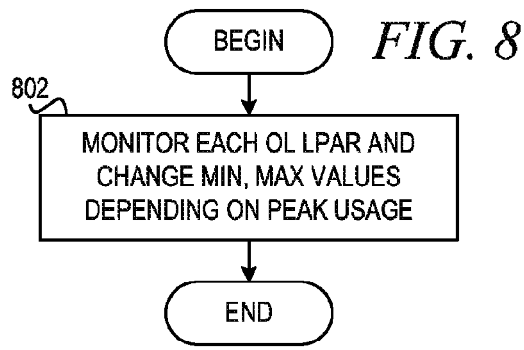
*FIG. 8*
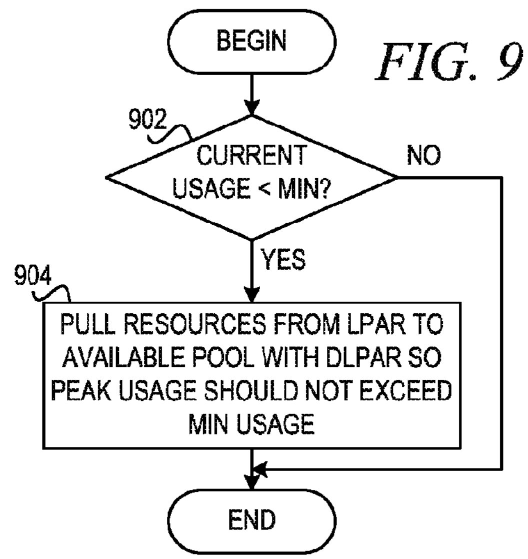
*FIG. 9*
*FIG. 10*
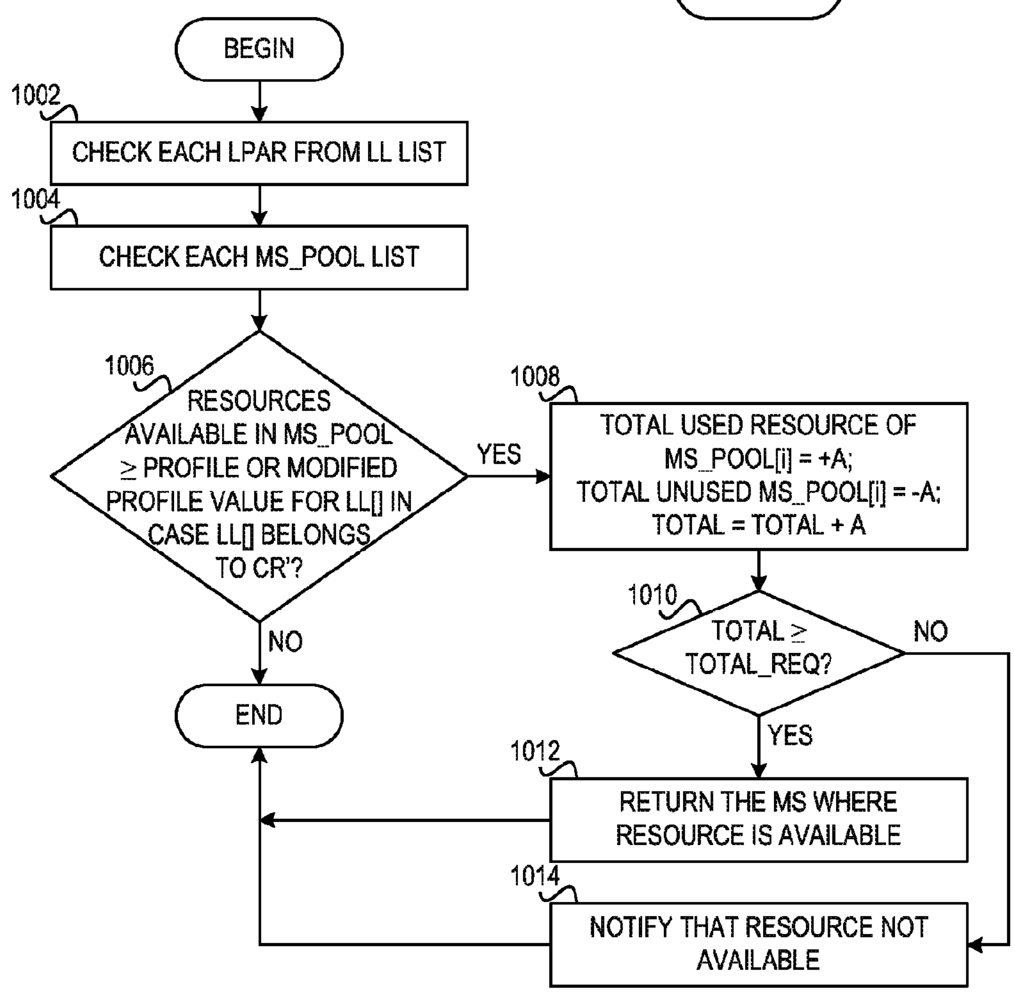

LOGICAL PARTITION LOAD MANAGER AND BALANCER

BACKGROUND

The present invention relates generally to an improved data processing apparatus and method and more specifically to mechanisms for managing and balancing load across multiple managed systems in a logical partitioning data processing system.

A logical partition, commonly called an LPAR, is a subset of computer's hardware resources, virtualized as a separate computer. In effect, a physical machine can be partitioned into multiple logical partitions, each hosting a separate operating system. Logical partitioning divides hardware resources. Two LPARs may access memory from a common memory chip, provided that the ranges of addresses directly accessible to each do not overlap. One partition may indirectly control memory controlled by a second partition, but only by commanding a process in that partition. CPUs may be dedicated to a single LPAR or shared.

The changing of resource allocations without restart of the logical partition is called dynamic logical partitioning (DLPAR). DLPAR is the capability of reconfiguring a logical partition dynamically without having to shut down the operating system that runs in the LPAR. DLPAR enables memory, CPU capacity, and I/O interfaces to be moved non-disruptively between LPARs within the same server.

Live partition mobility (LPM) is a feature of IBM POWER6® and POWER7® servers that allows an active LPAR to be relocated from one system to another without being deactivated, "POWER6" and "POWER7" are trademarks of International Business Machines Corporation in the United States and other countries. The source and target systems must have access to the same network and storage area networks but need not be of the same type. Any sized partition can be moved; essentially, memory content of the partition is copied asynchronously from one system to another to create a clone of the partition, with "dirty" pages being re-copied as necessary. When a threshold is reached (i.e., when a high percentage of the pages have been successfully copied across), the partition is transitioned to the target machine and any remaining pages are copied across synchronously.

SUMMARY

In one illustrative embodiment, a method, in a data processing system, is provided for managing and balancing load in multiple managed systems in a logical partitioning data processing system. The method comprises responsive to a critical logical partition requiring additional resources, determining whether one or more managed systems have available resources to satisfy resource requirements of the critical partition. The method further comprises performing at least one partition migration operation to move at least one logical partition between managed systems responsive to determining that one or more managed systems have available resources to satisfy resource requirements of the critical partition. The method further comprises performing at least one dynamic logical partitioning operation to allocate resources to at least one of the one or more critical logical partitions responsive to performing the at least one partition migration operation.

In other illustrative embodiments, the invention may be embodied as a computer program product comprising a computer storage medium having a computer readable program. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a block diagram of a data processing system with which aspects of the illustrative embodiments may advantageously be utilized;

FIG. 3 is a block diagram illustrating a logical partitioning scenario in which aspects of the illustrative embodiments may be implemented;

FIGS. 4A-4D illustrate pseudo-code for operation of a hardware management console for managing and balancing load in multiple managed systems in a logical partitioning data processing system;

FIGS. 5A and 5B show a flowchart illustrating operation of a mechanism for managing and balancing load in multiple managed systems in a logical partitioning data processing system in accordance with an illustrative embodiment;

FIG. 6 is a flowchart illustrating operation of a mechanism for finding a set of LPM-eligible LPARs and target managed systems in accordance with an illustrative embodiment;

FIG. 7 is a flowchart illustrating operation of a mechanism for pulling resources from a set of LPARs that are not critical and not LPM-eligible in accordance with an illustrative embodiment;

FIG. 8 is a flowchart illustrating operation of a mechanism for monitoring the LPARs in accordance with an example embodiment;

FIG. 9 is a flowchart illustrating operation of a mechanism for determining a sum of extra resources needed for critical LPARs requiring additional resources in accordance with an illustrative embodiment; and FIG. 10 is a flowchart illustrating operation of a mechanism for starting LPM followed by DLPAR in accordance with an illustrative embodiment.

DETAILED DESCRIPTION

The illustrative embodiments provide a mechanism for managing and balancing load in multiple managed systems in a logical partitioning data processing system. The mechanism may be utilized for datacenters where LPARs are spread across multiple managed systems. In these environments, some LPARs may be mission critical partitions for which performance takes priority over resource utilization. The mechanism of the illustrative embodiments performs Live Partition Mobility (LPM) combined with dynamic logical partitioning (DLPAR) to satisfy the resources needed for each partition. Performing LPM to move a LPAR from a source managed system to a target managed system may leave resources unutilized in the source managed system; therefore, the mechanism also manages utilization of resources at the source managed system after LPM activity.

Figure 2:
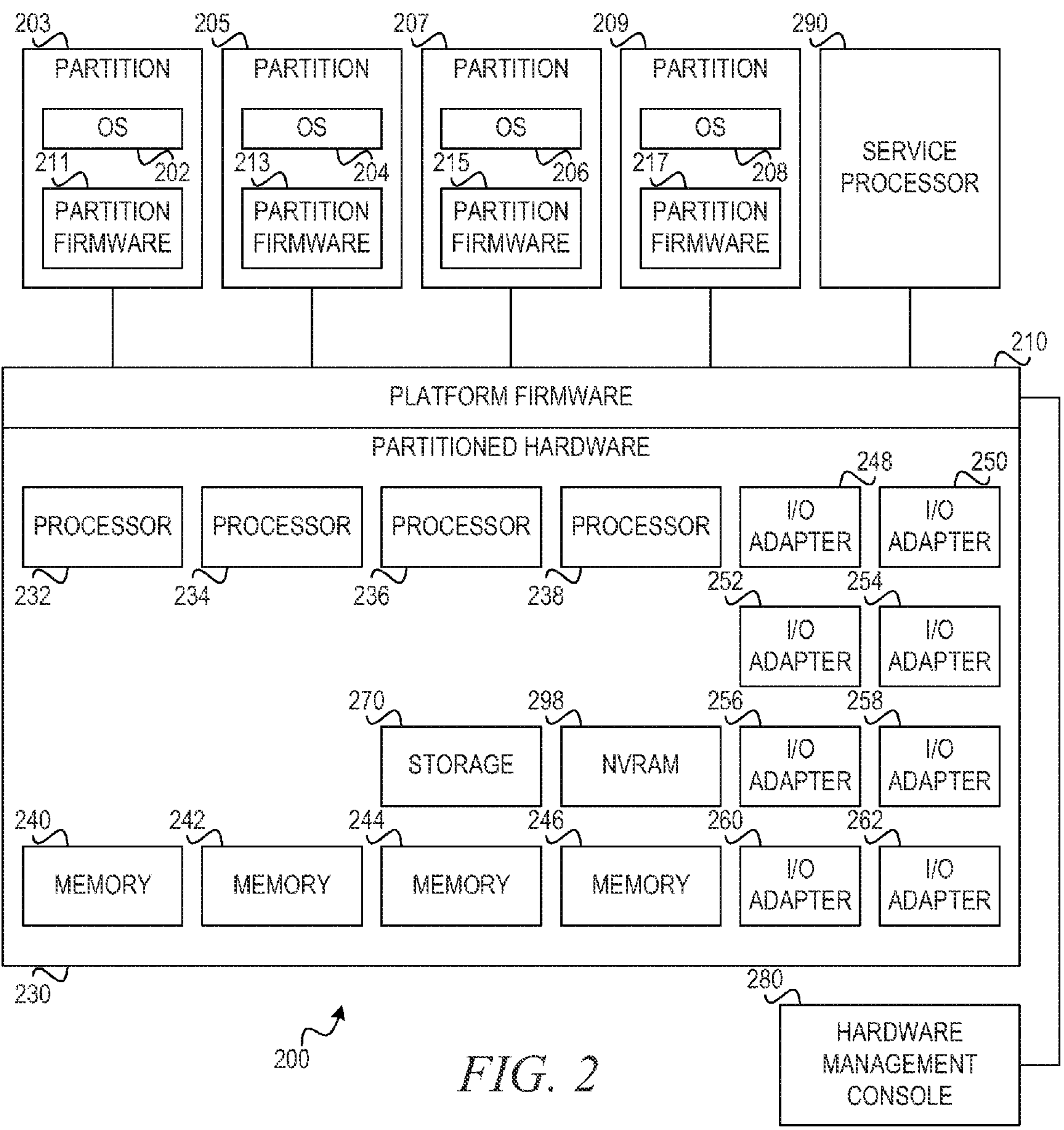
FIG. 2 is a block diagram of an exemplary logical partitioned platform in which exemplary aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards **111*a*-111*n*. Each of processor cards 111*a*-111*n* includes a processor and a cache memory. For example, processor card 111*a* contains processor 112*a* and cache memory 113*a*, and processor card 111*n* contains processor 112*n* and cache memory 113*n***.

Processor cards **111*a*-111*n* are connected to main bus 115. Main bus 115 supports a system planar 120 that contains processor cards 111*a*-111*n* and memory cards 123. The system planar also contains data switch 121 and memory controller/cache 122. Memory controller/cache 122 supports memory cards 123 that include local memory 116** having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119, PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots **135*a*-135*n* via bus 127**.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (N \TRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing, system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 2 is a block diagram of an exemplary logical partitioned platform in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously run on platform 200. These operating systems may be implemented using the AIX® operating system, the i5/OS™ operating system or the Linux™ operating system, for example, which are designed to interface with server firmware. Operating systems 202, 204, 206, and 208 are located in partitions 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Firmware 210 performs a number of functions and services for partitions 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EE- PROM), and nonvolatile random access memory (nonvolatile RAM). Thus, firmware 210 allows the simultaneous execution of independent operating system images 202, 204, 206, and 208 by virtualizing all hardware resources of logical partitioned platform 200. Virtualization is the pooling of information technology resources in a way that shields the physical nature and boundaries of those resources from users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™ V5R3 operating system that allows one to create and manage one operating system logical partitions by initiating a console session using service tools.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system other than the SMP system mentioned previously without departing from the spirit and scope of the present invention.

Figures 3, 4B:
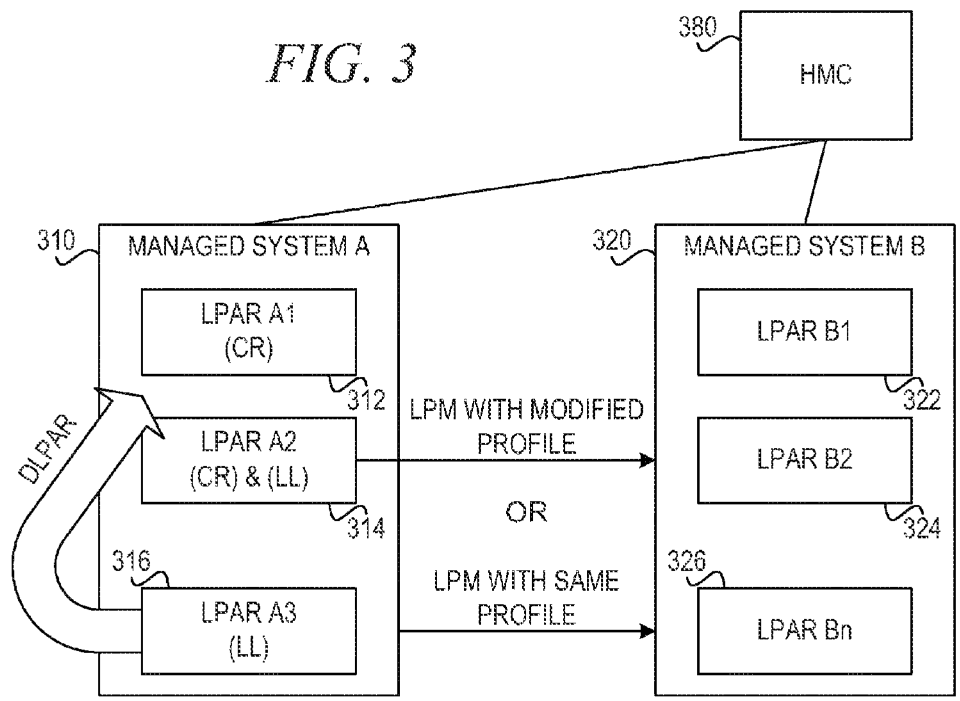

FIG. 3 is a Hock diagram illustrating a logical partitioning scenario in which aspects of the illustrative embodiments may be implemented. The logical partition scenario may be a customer datacenter in which Web servers, application servers, and databases are spread across different managed systems and in which only a subset of LPARs are specified as mission critical, meaning that these LPARs must perform at a predetermined level. An LPAR may be indicated as mission critical because of a service level agreement or because the LPAR hosts software that performs a critical task, such as a security function or the like. In contrast, an LPAR that is not critical may simply allow decreased performance during high workloads rather than requiring additional resources.

Managed system A 310 provides physical resources for LPAR. A1 312, LPAR A2 314, and LPAR A3 316. Managed system B 320 provides physical resources for LPAR B1 322, LPAR B2 324, and LPAR Bn 326. Hardware management console (HMC) 380 manages systems 310 and 320. In managed system 310, LPAR A1 312 and LPAR A2 314 are critical LPARs, and LPAR A2 314 and LPAR A3 316 are eligible to be moved to another managed system using Live Partition Mobility (LPM). Live partition mobility (LPM) is a feature of IBM POWER6® and POWER7® servers that allows an active LPAR to be relocated from one system to another without being deactivated. "POWER6" and "POWER7" are trademarks of International Business Machines Corporation in the United States and other countries. In this disclosure, LPARs that are eligible to be moved by LPM are referred to as LPM-eligible.

In the depicted example, when a set of critical LPARs, such as LPARs 312, 314, operate at a higher workload, these LPARs may use more resources. The resource profile for a critical LPAR may be set initially according to an expected workload. If the workload of the LPAR decreases, the resource HMC or virtualization layer may decrease the LPAR's resource profile. The resource profile of an LPAR may define a maximum amount of hardware resources, such as a number of processors or an amount of memory. The resource profile may also have an associated lower threshold and upper threshold. Resource utilization may vary depending on the workload experienced by the LPAR. If resource utilization drops below the lower threshold, the HMC or virtualization layer may decrease the resource profile of the LPAR. If resource utilization exceeds the upper threshold, the HMC or virtualization layer may increase the resource profile of the LPAR. At some point, the managed system may have no unutilized resources to allocate to an LPAR that requires additional resources. At this point, DLPAR operation cannot satisfy the need as there are no resources available in the managed system. However, resources may be available on other managed systems.

For example, managed system A my have no further unutilized resources to satisfy the increased resource requirements of critical LPARs 312 and 314. That is, managed system A cannot reallocate resources from LPAR A3 316 to satisfy the increased resource profiles of LPAR A1 312 and/or LPAR A2 314. If the managed system cannot satisfy the increased resource requirements of LPAR A1 312 and/or LPAR A2 314, then the performance of LPAR A1 312 and/or LPAR A2 314 may suffer, which is unacceptable for critical LPARs.

In the depicted example, managed system B 320 has one or more free processors and memory available, which may satisfy the resource profile of LPAR A3 316 or the modified resource profile of LPAR A2 314. Using LPM to move LPAR A3 316 from managed system A 310 to managed system B 320 may leave unutilized resources in managed system A 310 that would allow managed system A 310 to satisfy the increased resource profiles of LPAR A1 312 and LPAR A2 314 using DLPAR. Using LPM to move LPAR A2 314 to managed system B 320 may allow managed system B 320 to satisfy the modified resource requirements of LPAR. A2 314 and may leave unutilized resources in managed system A 310 that would allow managed system A 310 to satisfy the increased resource profile of LPAR A1 312 using DLPAR.

In accordance with an illustrative embodiment, HMC 380 monitors the resource utilization of each critical LPAR and the available resources across the managed systems. During setup, an administrator may identify the sot of critical LPARs (CR), LPM-eligible LPARs (LL), and other LPARs (OL). Because there are no resources available at managed system A 310, HMC 380 triggers LPM to migrate an LPM-eligibie LPAR to managed system B 320.

If HMC 380 migrates LPAR A2 312 to managed system B 320, then HMC 380 modifies its profile to increase its resources by a factor of X (% amount of resources to be increased, specified to satisfy peak load) and performs dynamic logical partitioning (DLPAR) operations at managed system A 310 to allocate unutilized resources to LPAR A1 312.

If HMC 380 migrates LPAR A3 316 to managed system B 320, HMC 380 moves LPAR A3 316 with the same resource profile, because LPAR A3 316 is LPM-eligible but not critical. HMC 380 then performs DLPAR operations to allocate leftover resources to a CR partition (A1 or A2) that is experiencing increased workload and increases the resource profile of critical LPARs that are experiencing increased workload by a factor of X.

While the description refers to live partition mobility (LPM) and dynamic logical partitioning (DLPAR), the illustrative embodiments are not limited to particular implementations of mechanisms for migrating logical partitions between managed systems or mechanisms for dynamically allocating resources to logical partitions. In addition, white the description mentions the terms "service processor" and "hypervisor," the illustrative embodiments may be applied to any mechanisms for virtualizing and partitioning hardware resources to instances of operating systems in a data processing environment.

FIGS. 4A-4D illustrate pseudo-code for operation of a hardware management console for managing and balancing load in multiple managed systems in a logical partitioning data processing system. In the pseudo-code of FIGS. 4A-4D, MS represents a managed system, CR represents the set of critical LPARs, LL represents the set of LPM-eligible LPARs in a managed system, OL represents the set of other LPARs in a managed system, MIN represents the minimum usage percentage value of an LPAR when pulling resources from a LPAR, MAX represents the maximum usage of an LPAR (i.e., if the maximum usage of any CR LPAR exceed this value, then the LPAR requires additional resources), and X represents the percentage by which resources of an LPAR should be increased in case usage exceeds MAX. The intersection of all CR and LL may not be equal to NULL. In other words, a given LPAR may be critical and also LPM-eligible. The MAX value for a CR LPAR, all CR LPARs in a managed system, or all CR LPARs across all managed systems may be set by a user.

FIG. 4A depicts pseudo-code for monitoring critical LPARs in accordance with an example embodiment. The hardware management console determines whether critical LPARs require additional resources. If critical LPARs require additional resources, the hardware management console attempts to move one or more LPM-eligible LPARs to another managed system using LPM. The hardware management console may then attempt DLPAR to satisfy resource requirements of critical LPAR and/or to allocate leftover resources after LPM. Operation of monitoring critical LPARs will be described in further detail below with respect to the flowchart of FIG. 5.

FIG. 4B depicts pseudo-code for storing MIN and MAX values of an LPAR in accordance with an example embodiment. The hardware management console continuously monitors other LPARs for peak usage and workload distribution over time. The hardware management console adjusts MIN and MAX values for LPARs accordingly.

FIG. 4C depicts pseudo-code for pulling resources from an LPAR using DLPAR in accordance with an example embodiment. The hardware management console determines the current usage percentage depending on peak usage of LPAR and workload distribution over time. If the hardware management console determines whether current usage is less than the minimum usage percentage value of an LPAR, the hardware management console pulls the amount of resources from the LPAR such that peak usage will not exceed the minimum usage percentage. Operation of pulling resources using DLPAR will be described in further detail below with respect to the flowchart of FIG. 6.

FIG. 4D depicts pseudo-code for determining whether any target managed system is available for LPM in accordance with an example embodiment. The hardware management console minds a pool managed systems with used resources and unused resources. The hardware management console arranges the LPARs in the LPM-eligible list, LL[ ], so that LPAR hosted on the same MS as CR requiring additional resources (CR') get higher priority. The hardware management console then determines the resources available in the MS pool and determines whether the resources available satisfy the resource requirements for the critical LPARs that require additional resources and are LPM-eligibie for each MS pool and for each LPAR.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROW, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart, illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or Hock diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart, and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIGS. 5A and 5B show a flowchart illustrating operation of a mechanism for managing and balancing load in multiple managed systems in a logical partitioning data processing system in accordance with an illustrative embodiment. B inning with FIG. 5A, operation begins, and the mechanism monitors the set of critical LPARs (CR) (block 502). In block 502, the mechanism may monitor LPARs as described in further detail below with respect to FIG. 8.

The mechanism then determines whether CR usage is greater than or equal to a predetermined MAX value (block 504). If no CR LPAR has usage greater than or equal to MAX, operation returns to block 502 to monitor the CR set of LPAR. If at least one CR LPAR has usage that is greater than or equal to MAX, indicating that it requires attention because the LPAR requires more resources, in block 504, the mechanism adds the CR LPARs over MAX to a set of CR LPARs requiring attention (CR') (block 506).

The mechanism determines the sum of extra resources needed by CR' (block 508). The mechanism determines the sum of the extra resources needed by the CR LPARs requiring attention as described in further detail below with respect to FIG. 9. The mechanism then determines whether dynamic logical partitioning (DLPAR) can satisfy the requirements of the CR LPARs requiring additional resources (block 510). If DLPAR can satisfy the requirements of LPARs CR', then the mechanism starts the DLPAR process (block 512), and operation returns to block 502 to monitor the set of critical LPARs.

If the mechanism determines that DLPAR cannot satisfy the requirements of the critical LPARs requiring additional resources in block 510, the mechanism finds a set of LPM-eligible LPARs and target managed systems (block 514). The mechanism finds a set of LPM-eligible LPARs and target managed systems as described in further detail below with respect to FIG. 6.

The mechanism then determines whether live partition mobility (LPM) can satisfy the resource requirements of the critical LPARs requiring additional resources (block 516). If LPM can satisfy, the requirements of the CR LPARs, then the mechanism starts the LPM process followed by DLPAR (block 518). The mechanism starts the LPM process and DLPAR as described in further detail below with respect to FIG. 10. Thereafter, operation returns to block 502 to monitor the set of critical LPARs.

If LPM cannot satisfy the requirements of the critical LPARs in block 516, the mechanism determines a total amount of resources available with possible LPM activity (block 520). Then turning to FIG. 5B, the mechanism pulls resources from a set of other LPAR (not critical and not LPM-eligible) running with non-critical applications (block 522). The mechanism pulls resources from the other LPARs as described in further detail below with respect to FIG. 7. The mechanism then finds a set of LPM-eligible LPARs and target managed systems (block 524). Again, the mechanism finds the set of LPM-eligible LPARs and target managed systems as described in further detail below with respect to FIG. 6.

The mechanism determines whether the sum of unutilized resources from LPM and pulled resources can satisfy the resource requirements of critical LPARs requiring additional resources (block 526). If the sum does not satisfy the requirements, the mechanism performs possible set of LPM and DLPAR to satisfy the resource need based on priority (block 528). Thereafter, operation ends. If the sum does satisfy the requirements in block 526, the mechanism pulls resources from other LPARs, performs DLPAR and LPM activity, and allocates resources to the set of critical LPARs requiring additional resources (block 530). Thereafter, operation ends.

FIG. 6 is a flowchart illustrating operation of a mechanism for finding a set of LPM-eligible LPARs and target managed systems in accordance with an illustrative embodiment. Operation begins, and the mechanism arranges the LPM-eligible LPARs with priority (block 602). LPARs hosted on the same managed system as CR' list get higher priority. The mechanism then determines a sum of the amount of resources available across the managed systems after possible LPM activity (block 604). Thereafter, operation ends.

FIG. 7 is a flowchart illustrating operation of a mechanism for pulling resources from a set of LPARs that are not critical and not LPM-eligible accordance with an illustrative embodiment. Operation begins, and the mechanism determines current usage percentage depending on peak usage of LPAR and workload distribution over time (block 702). The mechanism determines whether current usage is less than a predetermined MIN value (block 704). The MIN value is a minimum resource requirement of an LPAR. Thus, an LPAR may require 4 CPUs, but peak usage may be at approximately 2 CPUs. Thus usage is below the MIN value. That is, usage will always be less than or equal to the resources allocated to the LPAR, and the usage may fall below the MIN value even though the assigned resources are above the minimum.

If the mechanism determines that current usage is less than MIN, the mechanism pulls resources from the LPAR to the available pool using DLPAR such that peak usage should not exceed the MIN value (block 706). Thereafter, or if current usage is not less than MIN in block 704, operation ends.

FIG. 8 is a flowchart illustrating operation of a mechanism for monitoring the LPARs in accordance with an example embodiment. Operation begins, and the mechanism monitors each other LPAR and changes MIN and MAX values depending on peak usage (block 802). Thereafter, operation ends.

FIG. 9 is a flowchart illustrating operation of a mechanism for determining a sum of extra resources needed for critical LPARs requiring attention in accordance with an illustrative embodiment. Operation begins, and the mechanism determines whether current usage is less than a predetermined MIN value (block 902). The MIN value is a minimum resource requirement of an LPAR. Usage will always be less than or equal to the resources allocated to the LPAR, and the usage may fall below the MIN value even though the assigned resources are above the minimum. If the mechanism determines that current usage is less than MIN, the mechanism pulls resources from the LPAR to the available pool using DLPAR such that peak usage should not exceed the MIN value (block 904). Thereafter, or if current usage is not less than MIN in block 902, operation ends.

FIG. 10 is a flowchart illustrating operation of a mechanism for starting LPM followed by DLPAR in accordance with an illustrative embodiment. Operation begins, and the mechanism checks each LPAR from the list of LPM-eligible LPARs (block 1002). The mechanism checks each managed system pool list (block 1004). The mechanism then determines whether resources available in MS_POOL are greater than or equal to a profile or a modified profile value for an LPM-eligible LPAR in case the LPM-eligible LPAR is a critical LPAR requiring additional resources (block 1006). If the mechanism determines that resources available in MS_POOL are not greater than or equal to the profile or modified profile value, operation ends.

If the mechanism determines that resources available in MS_POOL are greater than or equal to the profile or modified profile value in block 1006, the mechanism sets the total used resource of MS_POOL[i] equal to +A, sets the total unused resource of MS_POOL[i] equal to −A, and increments TOTAL by A (block 1008). The mechanism then determines whether TOTAL is greater than or equal to the total required, TOTAL_REQ (block 1010).

If TOTAL is greater than or equal to TOTAL_REQ, then the mechanism returns the managed system where the resource is available (block 1012), and operation ends. If TOTAL is not greater than or equal to TOTAL_REQ in block 1010, then the mechanism notifies that the resource is not available (block 1014), and operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for managing and balancing load in multiple managed systems in a logical partitioning data processing system. The mechanism helps in datacenters or customer environments where LPARs are spread across multiple managed systems. In these environments, some LPARs may be mission critical and should not be starved for resources but may not have facility to share resources across the managed system. The mechanism of the illustrative embodiments performs Live Partition Mobility (LPM) followed by dynamic logical partitioning (DLPAR) to satisfy the resources needed for each partition. Performing LPM to move a LPAR from a source managed system to a target managed system may leave resources unutilized in the source managed system; therefore, the mechanism also manages utilization of resources at the source managed system after LPM activity.

The mechanism of the illustrative embodiments shares resources across the managed systems with LPM activity. The mechanism provides an efficient way of managing unutilized resources after LPM. The mechanism helps to efficiently manage resource requirements for the datacenters with DLPAR and LPM activity.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, for managing and balancing load across multiple managed systems in a logical partitioning data processing system, the method comprising:

responsive to a first logical partition requiring additional data processing resources in a first managed system, determining whether one or more managed systems have available resources to satisfy resource requirements of the first logical partition, wherein the first logical partition is marked as critical and not eligible for partition migration;

responsive to determining that the one or more managed systems have available resources to satisfy resource requirements of the critical partition using a combination of partition migration and dynamic logical partitioning, performing at least one partition migration operation to migrate a second logical partition from the first managed system to a second managed system within the multiple managed systems, wherein the second logical partition is marked as eligible for partition migration; and responsive to the at least one partition migration operation, performing at least one dynamic logical partitioning operation to allocate utilized processing resources resulting from the at least one partition migration operation and resources from a third logical partition in the first managed system to the first logical partition, wherein the third logical partition is marked as non-critical.

2. The method of claim 1, further comprising comparing usage of the first logical partition to a predetermined threshold to determine whether the first logical partition requires additional data processing resources.

3. The method of claim 2, wherein determining whether one or more managed systems have available resources to satisfy resource requirements of the first logical partition comprises:

responsive to determining the usage of the first logical partition being greater than the predetermined threshold, increasing a resource profile of the first logical partition;

adding the first logical partition to a set of critical logical partitions requiring attention;

determining a sum of additional data processing resources required by the set of critical logical partitions requiring attention;

determining a total amount of data processing resources available with possible partition migration and possible dynamic logical partitioning operations; and determining whether the total amount of data processing resources available with possible partition migration and possible dynamic logical partitioning operations exceeds the sum of additional data processing resources required by the set of critical logical partitions requiring attention.

4. The method of claim 3, wherein determining a total amount of data processing resources available with possible partition migration comprises:

identifying a set of migration eligible logical partitions in the multiple managed systems that are marked as eligible for partition migration, wherein a given logical partition in the set of migration eligible logical partitions is marked as critical.

5. The method of claim 4, wherein performing at least one partition migration operation comprises migrating the given logical partition with an increased resource profile.

6. The method of claim 3, wherein responsive to the total amount of data processing resources available with possible partition migration and possible dynamic logical partitioning operations being less than the sum of additional data processing resources required by the set of critical logical partitions requiring attention, performing the at least one dynamic logical partitioning operation comprises allocating data processing resources to logical partitions in the set of critical logical partitions requiring attention based on priority.

7. The method of claim 1, wherein performing at least one dynamic logical partitioning operation comprises allocating resources from at least one logical partition marked as not critical and not able to be migrated.

8. A computer program product comprising a computer readable storage medium having a computer readable program stored therein, wherein the computer readable program, when executed on a computing device, causes the computing device to:

responsive to a first logical partition requiring additional data processing resources in a first managed system, determine whether one or more managed systems have available resources to satisfy resource requirements of the first logical partition, wherein the first logical partition is marked as critical and not eligible for partition migration;

responsive to determining that the one or more managed systems have available resources to satisfy resource requirements of the critical partition using a combination of partition migration and dynamic logical partitioning, perform at least one partition migration operation to migrate a second logical partition from the first managed system to a second managed system within the multiple managed systems, wherein the second logical partition is marked as eligible for partition migration; and responsive to the at least one partition migration operation, perform at least one dynamic logical partitioning operation to allocate unutilized data processing resources resulting from the at least one partition migration operation and resources from a third logical partition in the first managed system to the first logical partition, wherein the third logical partition is marked as non-critical.

9. The computer program product of claim 8, further comprising comparing usage of the first logical partition to a predetermined threshold to determine whether the first logical partition requires additional data processing resources.

10. The computer program product of claim 9, wherein determining whether one or more managed systems have available resources to satisfy resource requirements of the first logical partition comprises:

responsive to determining the usage of the first logical partition being greater than the predetermined threshold, increasing a resource profile of the first logical partition;

adding the first logical partition to a set of critical logical partitions requiring attention;

determining a sum of additional data processing resources required by the set of critical logical partitions requiring attention;

determining a total amount of data processing resources available with possible partition migration and possible dynamic logical partitioning operations; and determining whether the total amount of data processing resources available with possible partition migration and possible dynamic logical partitioning operations exceeds the sum of additional data processing resources required by the set of critical logical partitions requiring attention.

11. The computer program product of claim 10, wherein determining a total amount of data processing resources available with possible partition migration comprises:

identifying a set of migration eligible logical partitions in the multiple managed systems that are marked as eligible for partition migration, wherein a given logical partition in the set of migration eligible logical partitions is marked as critical.

12. The computer program product of claim 11, wherein performing at least one partition migration operation comprises migrating the given logical partition with an increased resource profile.

13. The computer program product of claim 10, wherein responsive to the total amount of data processing resources available with possible partition migration and possible dynamic logical partitioning operations being less than the sum of additional data processing resources required by the set of critical logical partitions requiring attention, performing the at least one dynamic logical partitioning operation comprises allocating data processing resources to logical partitions in the set of critical logical partitions requiring attention based on priority.

14. The computer program product of claim 8, wherein performing at least one dynamic logical partitioning operation comprises allocating resources from at least one logical partition marked as not critical and not able to be migrated.

15. The computer program product of claim 8, wherein the computer readable program is stored in a computer readable storage medium in a data processing system and wherein the computer readable program was downloaded over a network from a remote data processing system.

16. The computer program product of claim 8, wherein the computer readable program is stored in a computer readable storage medium in a server data processing system and wherein the computer readable program is downloaded over a network to a remote data processing system for use in a computer readable storage medium with the remote system.

17. An apparatus, comprising:

a processor, and a memory coupled to the processor, wherein the memory comprises instructions which, when executed by the processor, cause the processor to:

responsive to a first logical partition requiring additional data processing resources in a first managed system, determine whether one or more managed systems have available resources to satisfy resource requirements of the first logical partition, wherein the first logical partition is marked as critical and not eligible for partition migration;

responsive to determining that the one or more managed systems have available resources to satisfy resource requirements of the critical partition using a combination of partition migration and dynamic logical partitioning, perform at least one partition migration operation to migrate a second logical partition from the first managed system to a second managed system within the multiple managed systems, wherein the second logical partition is marked as eligible for partition migration; and responsive to the at least one partition migration operation, perform at least one dynamic logical partitioning operation to allocate unutilized data processing resources resulting from the at least one partition migration operation and resources from a third logical partition in the first managed system to the first logical partition, wherein the third logical partition is marked as non-critical.

18. The apparatus of claim 17, wherein a given logical partition within the at least one logical partition is marked as being able to be migrated, wherein the given logical partition is marked as critical, and wherein performing at least one partition migration operation comprises migrating the given logical partition with an increased resource profile.

19. The apparatus of claim 17, wherein the instructions further cause the processor to compare usage of the first logical partition to a predetermined threshold to determine whether the first logical partition requires additional data processing resources;

wherein determining whether one or more managed systems have available resources to satisfy resource requirements of the first logical partition comprises:

responsive to determining the usage of the first logical partition being greater than the predetermined threshold, increasing a resource profile of the first logical partition;

adding the first logical partition to a set of critical logical partitions requiring attention;

determining a sum of additional data processing resources required by the set of critical logical partitions requiring attention;

determining a total amount of data processing resources available with possible partition migration and possible dynamic logical partitioning operations; and determining whether the total amount of data processing resources available with possible partition migration and possible dynamic logical partitioning operations exceeds the sum of additional data processing resources required by the set of critical logical partitions requiring attention;

wherein determining a total amount of data processing resources available with possible partition migration comprises identifying a set of migration eligible logical partitions in the multiple managed systems that are marked as eligible for partition migration, wherein a given logical partition in the set of migration eligible logical partitions is marked as critical and wherein performing at least one partition migration operation comprises migrating the given logical partition with an increased resource profile; and wherein responsive to the total amount of data processing resources available with possible partition migration and possible dynamic logical partitioning operations being less than the sum of additional data processing resources required by the set of critical logical partitions requiring attention, performing the at least one dynamic logical partitioning operation comprises allocating data processing resources to logical partitions in the set of critical logical partitions requiring attention based on priority.

20. The apparatus of claim 17, wherein performing at least one dynamic logical partitioning operation comprises allocating resources from at least one logical partition marked as not critical and not able to be migrated.

* * * * *